(12) United States Patent
Meher et al.

(10) Patent No.: US 10,703,962 B2
(45) Date of Patent: Jul. 7, 2020

(54) HYDROGELS OF GRAFT POLYMERS FOR ACID DIVERSION

(71) Applicant: Halliburton Energy Services, Inc., Houston, TX (US)

(72) Inventors: Pratiksha Shivaji Meher, Pune (IN); Ravikant S. Belakshe, Pune (IN); Larry Steven Eoff, Porter, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/771,739

(22) PCT Filed: Dec. 21, 2015

(86) PCT No.: PCT/US2015/067029
§ 371 (c)(1),
(2) Date: Apr. 27, 2018

(87) PCT Pub. No.: WO2017/111893
PCT Pub. Date: Jun. 29, 2017

(65) Prior Publication Data
US 2018/0362840 A1    Dec. 20, 2018

(51) Int. Cl.
| | |
|---|---|
| *E21B 43/25* | (2006.01) |
| *C09K 8/72* | (2006.01) |
| *C09K 8/68* | (2006.01) |
| *C09K 8/88* | (2006.01) |
| *C09K 8/90* | (2006.01) |
| *E21B 43/28* | (2006.01) |

(52) U.S. Cl.
CPC ............ *C09K 8/725* (2013.01); *C09K 8/685* (2013.01); *C09K 8/887* (2013.01); *C09K 8/905* (2013.01); *E21B 43/25* (2013.01); *E21B 43/283* (2013.01)

(58) Field of Classification Search
CPC ........ C09K 8/725; C09K 8/685; C09K 8/905; E21B 43/25; E21B 43/283
See application file for complete search history.

(56) References Cited

U.S. PATENT DOCUMENTS

| | | |
|---|---|---|
| 5,304,620 A | 4/1994 | Holtmyer et al. |
| 6,173,778 B1 | 1/2001 | Rae et al. |
| 6,667,279 B1 * | 12/2003 | Hessert ................. C08L 1/26 507/225 |
| 6,983,799 B2 | 1/2006 | Reddy et al. |

(Continued)

OTHER PUBLICATIONS

International Search Report and Written Opinion for PCT/US2015/067029 dated Sep. 20, 2016.

(Continued)

*Primary Examiner* — Silvana C Runyan
(74) *Attorney, Agent, or Firm* — Thomas Rooney; C. Turney Law Group PLLC

(57) ABSTRACT

Methods, compositions, and systems that use hydrogels of graft polymers for diversion of acidic treatment fluids in subterranean formations. A method for acid diversion may comprise: applying a first acidizing treatment to a first treatment zone of a subterranean formation; introducing a hydrogel to the first treatment zone, wherein the hydrogel comprises a graft polymer that is crosslinked; and applying a second acidizing treatment to the subterranean formation, wherein the hydrogel diverts the second acidizing treatment to a second treatment zone.

19 Claims, 2 Drawing Sheets

(56) References Cited

U.S. PATENT DOCUMENTS

| | | |
|---|---|---|
| 7,316,275 B2 | 1/2008 | Wang et al. |
| 20,080,085 | 4/2008 | Wang et al. |
| 7,727,936 B2 | 7/2010 | Pauls et al. |
| 7,897,546 B2 | 3/2011 | Showalter et al. |
| 2005/0197257 A1 | 9/2005 | Bouwmeester |
| 2008/0125334 A1* | 5/2008 | Burns .................. C09K 8/5083 507/219 |
| 2010/0036017 A1* | 2/2010 | Eoff ........................ C04B 28/02 523/130 |
| 2013/0014951 A1 | 1/2013 | Fitzpatrick |
| 2014/0083703 A1* | 3/2014 | Murphy ................. C09K 8/508 166/300 |
| 2014/0090847 A1* | 4/2014 | Liang ..................... C09K 8/508 166/305.1 |
| 2014/0116707 A1 | 5/2014 | Sarda et al. |
| 2015/0027710 A1* | 1/2015 | Miller .................... C09K 8/426 166/300 |
| 2016/0024367 A1* | 1/2016 | Zha .......................... C09K 8/64 166/308.2 |
| 2016/0177166 A1* | 6/2016 | Reddy ..................... C09K 8/44 166/292 |
| 2018/0346787 A1* | 12/2018 | Belakshe ................. C09K 8/12 |

OTHER PUBLICATIONS

BioVert Datasheet from Halliburtion Energy Services, Inc. dated Jun. 2011.
TLC-80 diverting agent datasheet from Halliburton Energy Services, Inc. dated Dec. 2007.
OilSEEKER datasheet from Schlumberger dated 2014.
OilMAX datasheet from Schlumberger dated 2010.
VDA datasheet from Schlumberger dated 2014.
"Synthesis, characterization and swelling behaviour of poly(acrylamide-comethacrylic acid) grafted Gum ghatti based superabsorbent hydrogels" Mittal et al. dated 2010.
"Synthesis, Characterization, and Drug Release Study of Acrylamide-Co-Itaconic Acid Based Smart Hydrogel" Bera et al. dated 2014.
"Synthesis and Swelling Behaviors of graft copolymer Based on Chitosan-g-poly(AA-co-HEMA)" to Sadeghi dated Dec. 2010.
"Novel High Capacity Swelling Superabsorbent Composite and Its Potential for Controlled Release of Fertilizers" Ali et al. Dated 2010.

* cited by examiner

US 10,703,962 B2

HYDROGELS OF GRAFT POLYMERS FOR ACID DIVERSION

BACKGROUND

The present disclosure relates to treatment of subterranean formations and, in specific examples, to methods, compositions, and systems that use hydrogels of graft polymers for diversion of acidic treatment fluids in subterranean formations.

The production of desirable fluids (e.g., oil and gas) from subterranean formations may often be enhanced by stimulating a region of the formation surrounding a well bore. Where the subterranean formation comprises acid-soluble components, such as those present in carbonate and sandstone formations, stimulation is often achieved by contacting the formation with a treatment fluid comprising an acid. These acid stimulation treatments are often referred to as "acidizing" the formation. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface, e.g., "flowing back" the well, leaving a desirable amount of voids (e.g., wormholes) within the formation, which enhance the formation's permeability and may increase the rate at which hydrocarbons subsequently may be produced from the formation. One method of acidizing, known as "fracture acidizing," comprises injecting a treatment fluid comprising an acid into the formation at a pressure above the fracturing pressure. Another method of acidizing, known as "matrix acidizing," comprises injecting the treatment fluid into the formation at a pressure below fracturing pressure within the subterranean formation.

To enhance acidizing treatments, various additives may be added to the acidic treatment fluid. One such additive is a gelling agent which may, among other things, increase viscosity of the treatment fluid for improved diversion and particulate suspension, increase penetration into the reservoir by decreasing the reactivity of such fluid, reduce fluid loss, and/or reduce pumping requirements by reducing friction in the well bore. In some instances, the acidic treatment fluid may be self-diverting to further enhance the treatment. Among other things, a self-diverting acidizing treatment may effectively place the acid in a desired region within the subterranean formation, thereby creating a more optimal interaction of the acid with the acid-soluble components of the formation, which may create a desired network of channels that may penetrate deeper into the formation than a conventional acidizing treatment. One such self-diverting treatment fluid includes a crosslinkable gelling agent, a crosslinking agent, and a pH buffer to provide a crosslink within a certain pH range. A crosslinkable gelling agent comprising crosslinkable polyacrylamide-based polymers has been found to be useful in calcium carbonate formations. In such a treatment, as the acid reacts, the pH of the self-diverting treatment fluid increases, which causes the fluid to viscosify so as to form a gel that, inter alia, temporarily plugs the perforations or natural fractures accepting the most fluid flow. When the remaining treatment fluid encounters the gel, it is diverted to other portions of the formation. This process then may be repeated—as the treatment fluid is diverted, the acid creates another conductive void, and the treatment fluid is viscosified, diverts flow, and so forth. Once the treatment is complete, the viscosified treatment fluid may be "broken" by reducing its viscosity to a more readily pumpable level, so that the full productivity of the well can be restored.

Despite the advantages of using gelling agents in acid treatments, such treatments may be problematic. For example, conventional polymeric gelling agents may leave an undesirable residue in the subterranean formation after use. As a result, potentially-costly remedial operations may be required to clean up the surfaces inside the subterranean formation. Foamed treatment fluids and emulsion-based treatment fluids have been employed to minimize residual damage, but increased expense and complexity often result.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
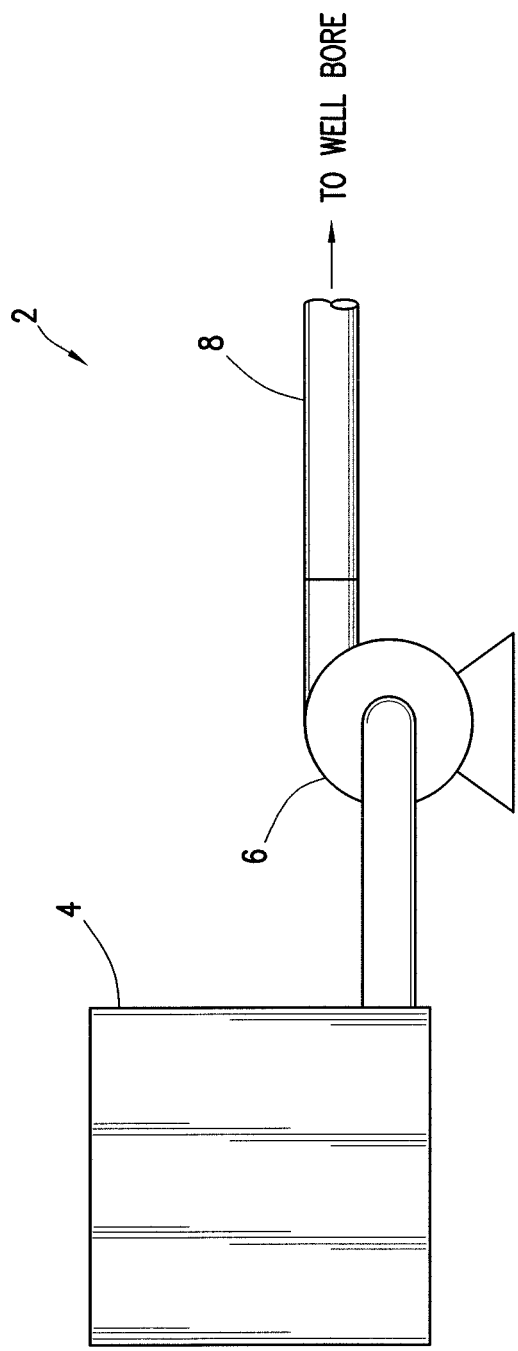
FIG. 1 is a schematic illustration of an example fluid handling system for preparation and delivery of an acidic treatment fluid to a wellbore.

Provided herein are methods, compositions, and systems that use hydrogels of graft polymers in acidizing treatments. By way of example, the hydrogels may be used in acidizing treatments for diversion due to their water-absorbing properties. Advantageously, as the hydrogels may be pH activated, they can provide for effective diversion in acidizing treatments. Further, unlike the traditional particulates used for acid diversion, the size and shape of any the hydrogels may be irrelevant since the particles swell in order to perform their diversion. In addition, the hydrogels may be compatible with the formation and may not damage the formation. Because hydrogels may be salt tolerant, they may be suitable for use in high saline environments (e.g., 2% sodium or potassium chloride) as well as for fluid diversion applications involving acid diversion. The hydrogels should typically degrade over time, making them suitable for a wide variety of subterranean formation types. Further, the hydrogels may be chemically hydrolysable and/or thermally degradable. Additionally, the graft-polymer-based hydrogels may be generally non-hazardous and should not pose a risk to personnel and are not expected to cause formation damage.

The acidizing treatments may comprise applying a first acidizing treatment to a subterranean formation. The first acidizing treatment may include placing an acidic treatment fluid comprising an aqueous base fluid, an acid, and a hydrogel into a subterranean formation. The hydrogel may comprise a graft biopolymer that is crosslinked. The hydrogel may not swell (or have a reduced tendency to swell) at pH below 2, which may be the initial pH of the acidic treatment fluid, but should show a considerable increase in swelling properties at pH from 2 to 4. The hydrogel would initially be placed in the subterranean formation in a first treatment zone. As used herein, the term "zone" simply refers to a portion of the formation and does not imply a particular geological strata or composition.

The acid in the acidic treatment fluid may react with the subterranean formation in the first treatment zone. As the acid reacts with the subterranean formation, the pH of the acidic treatment fluid should rise such that the hydrogel may be activated. The hydrogel may then start swelling and form a barrier to fluid flow in the first treatment zone. The barrier may reduce the flow of fluids in the first treatment zone. The hydrogel may absorb water from the acidic treatment fluid or an aqueous spacer fluid introduced to the subterranean formation. The barrier formed by the hydrogel may divert subsequent acidizing treatments to a second treatment zone. The second treatment zone may have a permeability that is less than the first treatment zone such that the injected fluids preferentially enters the first treatment zone until diversion with the hydrogel. The first and second acidizing treatments may include use of the same or different acidic treatment fluids. The hydrogel may be included in the first acidizing treatment, the second acidizing treatment, or both the first and second acidizing treatments. Alternatively, the hydrogel may be introduced into the subterranean formation between the first and second acidizing treatments. The acidizing treatments may be repeated until the desired number of stages of acidic treatment fluids have been pumped.

The term "hydrogel" as used herein refers to hydrogel in particulate form. Hydrogels are typically formed by cross-linking polymer chains and are well known for their ability to absorb water. Hydrogels are widely used in absorbent articles, such as disposable diapers, sanitary napkins, and the like, where their ability to absorb water may be beneficial. The hydrogel may be any suitable size. Without limitation, the hydrogel may have an average particle size in the range of about 5 microns to about 4,000 microns or form about 5 microns to about 1,500 microns or from about 20 microns to about 200 microns. However, average particle sizes outside these disclosed ranges may also be suitable for particular applications. As used herein, the term "average particle size" refers to volume mean diameter. Even further, the hydrogel may have any suitable shape, including, but not limited to, platelets, shavings, fibers, flakes, ribbons, rods, spheroids, toroids, pellets, tablets, and other suitable physical shapes. The hydrogel may have a well-defined physical shape and/or an irregular geometry.

The hydrogel may be considered a superabsorbent material that can absorb and retain up to a minimum of its own weight in water. Without limitation, the hydrogel may be capable of absorbing a minimum of one time, five times, twenty times, or one hundred times its own weight in water. In some embodiments, the hydrogel may absorb 1,000 times or even 2,000 times its own weight. Absorbency may be defined under standard ambient temperature (e.g., 77° F.) and pressure (1 atmosphere) in distilled water.

The swelling characteristics of the hydrogel may be tailored to be pH activated in that the absorbency of the hydrogel may be substantially reduced at extremely low pH (e.g., <2). Without limitation, the absorbency of the hydrogel may be reduced by 50%, 80%, 90%, 99%, or even greater, at pH less than 2 as compared to neutral pH. Accordingly, the hydrogel may be pH activated in that the swell characteristics may be dependent on pH. By way of example, the hydrogel may be included in an acidic treatment fluid having a pH of less than 2. As the acid spends, the pH of the acidic treatment fluid may rise to from about 2 to about 4, thus activating the hydrogel. "Activation" of the hydrogel, as used herein, may refer to hydrogel's swelling characteristics being enhanced, for example, an increase in absorbency of at least 10%, 50%, 100%, or even more. The swelling characteristics of the hydrogel may also be dependent on salt concentration. The hydrogel may also be salt tolerant in that their swelling may be limited less than other materials when used in salt solutions. Additional factors may also impact the swelling characteristics of the hydrogel, including monomer and crosslinker concentration, among others.

The hydrogel may comprise graft polymers that are crosslinked. Without limitation, the graft polymers may comprise a polymer backbone and side chains, which may be derived from synthetic monomers and/or synthetic polymers, for example. The graft polymers may include certain hydrophilic groups that may make them pH-sensitive, in that the swelling may be activated at a specific pH. In this manner, the hydrogel may be placed in the acidic treatment fluid but not swell until spending of the acid causing the acidic treatment fluid to reach a pH at which the hydrogel may be activated. The polymer backbone may comprise a biopolymer, such as a natural, modified, and derivatized polysaccharides and proteins of amino acids. Without limitation, examples of suitable biopolymers may include xanthan, diutan, guar gum, galactomannan gum, cellulose, starch, chitosan, collagen, gelatin, agarose, chitin, polyaspartic acid, pectin, dextran, gum arabica, alginate, carrageenan, polylactide, polycaprolactone, polyglycolide, polyhydroxybutyrate, lignin, lignosulfonates, derivatives thereof, and combinations thereof. In addition, the polymer backbone may comprise an organic acid, such as polyitaconic acid.

The side chains of the graft polymer may be derived from any of a variety of suitable materials. By way of example, the side chains may be derived from synthetic monomers and synthetic polymers. Without limitation, examples of suitable synthetic monomers may include acrylates, methacrylates, acrylamide, methacrylamide, acrylic acid, and methacrylic acid. Suitable acrylates and methacrylates may also include hydroxyalkyl acrylates and hydroxyalkyl methacrylates. Suitable acrylamides may include n-isopropylacrylamide and hydroxymethylacrylamide. An example of a suitable methacrylate may include 2-hydroxyethyl methacrylate.

Any of a variety of suitable crosslinkers may be used for forming the graft polymer that is crosslinked. Without limitation, a suitable crosslinker may comprise a bisacrylamide. Non-limiting examples of suitable bisacrylamides may include bisacrylamides of primary or secondary amines, such as N,N'-methylenebisacrylamide (MBA), N,N'-ethylenebisacrylamide, bis-acryloylpiperazine and bis-acryloylcystamine (CH2=CH—(C=O)—NH—S—S—NH—(C=O)—CH=CH2). Additional examples of suitable crosslinkers may include N,N'-polyoxyalkylene-bisacrylamide, N,N'-diallyltartaramide, N,N'-diallylgalactardiamide, N,N'-diallylxylardiamide, piperazine diacrylate, N,N'-bisacrylylcystamine, and N,N'-diallyltartardiamide.

Without limitation, a suitable graft polymer may comprise a polysaccharide backbone and side chains derived from acrylamide and methacrylic acid. Suitable polysaccharides may include, but are not limited to, xanthan, diutan, glucomannan, guar gum, ghatti gum, galactomannan gum, cellulose, starch, chitosan, agarose, chitin, pectin, dextran, gum arabica, Any of a variety of suitable techniques may be used for preparing this graft polymer. Without limitation, a poly (acrylamide-co-methacrylic acid) grafted gum ghatti-based biopolymer may be obtained by mixing of acrylamide and methacrylic acid crosslinked onto gum ghatti using N,N'-methylenebisacrylamide as a crosslinker and ascorbic acid and potassium persulphate redox pair as an initiator.

Without limitation, another suitable graft polymer may comprise a copolymer of acrylamide and itaconic acid. Any of a variety of suitable techniques may be used for preparing this graft polymer. Without limitation, these hydrogels may be synthesized using copolymers made from acrylamide as a nonionic monomer and itaconic acid as an anionic monomer. The swelling properties of the resultant graft polymer may be tuned by changing the concentration of the monomers.

Without limitation, another suitable graft polymer may comprise a chitosan-based biopolymer. Chitosan is a linear polysaccharide that comprises randomly distributed β-(1-4)-linked D-glucosamine (deacetylated unit) and N-acetyl-D-glucosamine (acetylated unit). Suitable chitosan-based biopolymers may have side chains derived from acrylic acid and methacrylates, such as hydroxyalkyl methacrylates. A suitable chitosan-based biopolymer may comprise a chitosan-g-poly(acrylic acid-co-2-hydroxyethyl methacrylate) biopolymer. Any of a variety of suitable techniques may be used for preparing this graft polymer. Without limitation, the grafted copolymer may be prepared by grafting acrylic acid and 2-hydroxyethyl methacrylate monomers onto chitosan using ammonium persulfate as an initiator and methylenebisacrylamide as a crosslinker.

Optionally, the hydrogel may be a hydrogel composite in which the graft polymerization occurred in the presence of a desiccant such that the desiccant may be also be grafted onto the biopolymer, in addition to the side chains derived from synthetic monomer. Without limitation, suitable desiccants may include a mesoporous molecular sieve or silica gel. Suitable examples of mesoporous molecular sieves may include a mesoporous form of silica, such as mesoporous silica nanoparticles. An example of suitable mesoporous silica nanoparticles is commonly referred to as MCM-41. Without limitation, grafting of acrylic acid monomers onto glucomannan may occur in the presence of the dessicant. The resulting polyacrylate may be neutralized, for example, with sodium, to form poly(sodium acrylate) side chains grafted onto glucommannan. A composite may be formed that comprises the dessicant, such as silica gel, and the galactomannan-g-poly(sodium acrylate).

The hydrogel may be placed into a subterranean formation in an acidizing treatment, such as by introducing an acidic treatment fluid comprising the hydrogel into a subterranean formation. Generally, the hydrogel may be included in the acidic treatment fluid in an amount suitable for a particular application, including without limitation in an amount in a range from about 0.05% to about 10% by weight of the acidic treatment fluid. By way of example, the hydrogel may be present in an amount of about 0.05%, 0.1%, about 1%, about 2%, about 3%, about 4%, about 5%, about 6%, about 7%, about 8%, about 9%, or about 10% by weight of the acidic treatment fluid. One of ordinary skill in the art with the benefit of this disclosure should be to select an appropriate type and amount of hydrogel for a particular application.

The acidic treatment fluid may comprise an aqueous base fluid. Suitable aqueous base fluids may comprise, without limitation, freshwater, saltwater, brine, seawater, or any other suitable base fluids that preferably do not undesirably interact with the other components used in the sealant composition. In some embodiments, the base fluid may be an aqueous salt solution. Such aqueous salt solutions can have a salt concentration ranging between about 0.1% and about 10% by weight. Without limitation, the salt concentration may between about 1% and about 10% by weight or between about 2% and about 5%. The salt of such aqueous salt solutions may comprise an alkali metal or alkaline earth metal salt. Illustrative alkali metal salts may include, for example, LiF, LiCl, LiBr, LiI, NaF, NaCl, NaBr, NaI, KF, KCl, KBr, KI, RbF, RbCl, RbBr, RbI, CsF, CsCl, CsBr, and CsI. Illustrative alkaline earth metal salts may include, for example, CaCl2, CaBr2, CaI2, MgCl2, MgBr2, MgI2, SrCl2, SrBr2, SrI2, BaCl2, BaBr2, and BaI2. Other alkali metal or alkaline earth metal salts such as, for example, nitrates, acetates, and soluble formates can also be used for forming the aqueous salt solution.

The acid included in the acidic treatment fluid may include any acid capable of reacting with acid-soluble components of the subterranean formation. By dissolving the acid-soluble components, the acid may create conductive channels in the subterranean formation to improve the flow of oil, gas, or other desirable fluids from the subterranean formation into the wellbore (or the flow of injected fluids from the wellbore into the subterranean formation). Without limitation, suitable acids may include, but are not limited to, hydrochloric acid; hydrofluoric acid; acetic acid; formic acid; sulfuric acid; sulfamic acid; chloroacetic acid; nitric acid; phosphoric acid; tartaric acid; oxalic acid; lactic acid; glycolicaminopolycarboxylic acid; acid; polyaminopolycarboxylic acid; citric acid; ethylene diamine tetra acetic acid; and any combination thereof. The selection of an acid may depend on a number of factors, including the type of subterranean formation being treated. Without limitation, the acid may be present in the acidic treatment fluid in an amount ranging from 0.5% to about 30% by weight of the treatment fluid, such as about 0.5%, about 1%, about 3%, about 5%, about 8%, about 12%, about 15%, about 15%, about 18%, about 21%, about 25%, about 28%, or about 30% by weight of the acidic treatment fluid.

Without limitation, a clay may be included in the acidic treatment fluid. Without being limited by theory, it is believed that properties of the hydrogel may be enhanced by the inclusion of the clay. Examples of suitable clays may include, without limitation, attapulgite, kaolin, alumina, silica gel, mica, bentonite, montmorillonite, titanium dioxides, and combinations thereof.

Depending on the treatment, the acidic treatment fluids optionally may comprise any number of additional additives, including, but not limited to, corrosion inhibitors, scale inhibitors, fluid loss control additives, gas, emulsifiers, paraffin inhibitors, asphaltene inhibitors, catalysts, hydrate inhibitors, iron control agents, clay control agents, biocides, combinations thereof, and the like. A person skilled in the art, with the benefit of this disclosure, should recognize the types of additives that may be included in the acidic treatment fluids for a particular application.

The acidizing treatment may further utilize an aqueous spacer fluid. An aqueous spacer fluid may be introduced into the wellbore after a first acidizing treatment has been applied to the subterranean formation. The aqueous spacer fluid may function to separate the first acidizing treatment from the second acidizing treatment. The first acidizing treatment and the second acidizing treatment may include use of the same acidic treatment fluid or different acidic treatment fluids. The hydrogel may be included in the first acidizing treatment, the second acidizing treatment, or both. The hydrogel may absorb water from the aqueous spacer fluid. While the preceding description has described inclusion of the hydrogel in the acidic treatment fluid, acid diversion may also be achieved by introducing the hydrogel into the subterranean formation between the first and second acidizing treatments. By way of example, the hydrogel may be included in the aqueous spacer fluid.

Removal of the hydrogel, if desired, may be effected by any number of suitable treatments. Because the hydrogel may include a biopolymer backbone, they may be removed by acid/base hydrolysis and/or by contact with oxidizers. Removal may include contacting the hydrogel with an oxidizer, such as persulfate, alkali metal chlorite or hypochlorite, peroxides, ammonium or metal chlorate, bromate, iodates or perchlorate, perbromate, periodate. Without limitation, specific examples of suitable oxidizers may include sodium persulfate, ammonium persulfate, potassium persulfate, lithium hypochlorite, or sodium hypochlorite, calcium hypochlorite, sodium chlorate, sodium bromate, sodium iodate, sodium perchlorate, sodium perbromate, sodium periodate, potassium chlorate, potassium bromate, potassium iodate, potassium perchlorate, potassium perbromate, potassium periodate, ammonium chlorate, ammonium bromate, ammonium iodate, ammonium perchlorate, ammonium perbromate, ammonium periodate, magnesium chlorate, magnesium bromate, magnesium iodate, magnesium perchlorate, magnesium perbromate, magnesium periodate, zinc chlorate, zinc bromate, zinc iodate, zinc perchlorate, zinc perbromate, zinc periodate, sodium perborate, t-butyl hydroperoxide, or combinations thereof. The oxidizer may be introduced into the formation by way of the wellbore. Without limitation, the hydrogel may also be susceptible to hydrolysis by acids so the hydrogel may be contacted by an acid in the subterranean formation, for example, to break down the graft polymer backbone (e.g. a biopolymer backbone). In addition, certain of the hydrogels may be susceptible to base hydrolysis so may be contacted with a base on the subterranean formation for removal.

Accordingly, this disclosure describes systems, compositions, and methods that may use hydrogels of graft polymers for acid diversion. A method for acid diversion may be provided that comprises applying a first acidizing treatment to a first treatment zone of a subterranean formation; introducing a hydrogel to the first treatment zone, wherein the hydrogel comprises a graft polymer that is crosslinked; and applying a second acidizing treatment to the subterranean formation, wherein the hydrogel diverts the second acidizing treatment to a second treatment zone. Another method for acid diversion may be provided that comprises introducing an acidic treatment fluid to a first treatment zone of a subterranean formation, wherein the acidic treatment fluid comprises an aqueous base fluid, an acid, and a hydrogel, wherein the hydrogel comprises a graft polymer that is crosslinked; reacting the acid with acid-soluble materials in the first treatment zone such that pH of the acidic treatment fluid increases from an initial pH of about 2 or less to a pH of from about 2 to about 4 such that the hydrogel is activated; allowing the hydrogel to form a barrier to fluid flow in the first treatment zone; and diverting a subsequently introduced acidic treatment fluid to a second treatment zone in the subterranean formation. A well system may be provided that comprises an acidic treatment fluid comprising an aqueous base fluid, an acid, and a hydrogel, wherein the hydrogel comprises a graft polymer that is crosslinked; a fluid handling system comprising the acidic treatment fluid; and a conduit fluidically coupled to the fluid handling system and a wellbore.

These methods, systems, and compositions may include any of the various features of the compositions, methods, and systems disclosed herein in any combination. Without limitation, the first acidizing treatment and the second acidizing treatment may utilize the same acidic treatment fluid. The hydrogel may be introduced to the first treatment zone in the first acidizing treatment. Applying the first acidizing treatment may comprise introducing an acidic treatment fluid comprising an aqueous base fluid, an acid, and the hydrogel into the first treatment zone. The acidic treatment fluid may have a pH of less than 2 when introduced into the subterranean, wherein the acid reacts in the first treatment zone such that the pH of the acidic treatment fluid increases to a pH of greater than 2. The step of introducing the hydrogel to the first zone may comprise introducing an aqueous spacer comprising the hydrogel between the first acidizing treatment and the second acidizing treatment. An aqueous spacer fluid may be introduced into the subterranean formation between the acidic treatment fluid and the subsequently introduced acidic treatment fluid. An additional step may comprise allowing the hydrogel to degrade over time in the subterranean formation. An additional step may comprise contacting the hydrogel in the subterranean formation with an oxidizer. The graft polymer may comprise a biopolymer backbone. The graft polymer may comprise a poly(acrylamide-co-methacrylic acid) grafted gum ghatti-based biopolymer. The graft polymer may comprise a copolymer of acrylamide and itaconic acid. The graft polymer may comprise a chitosan backbone and side chains derived from acrylic acid and 2-hydroxy-ethyl methacrylate. The graft polymer may comprise composite of silica gel and galactomannan-g-poly (sodium acrylate). The fluid handling system comprises a fluid supply and pumping equipment. Combinations of these various features may be also be used in the methods, systems, and compositions.

Example methods of using the hydrogel will now be described in more detail with reference to FIGS. 1 and 2. Any of the previous examples of the hydrogel may apply in the context of FIGS. 1 and 2. Referring now to FIG. 1, a fluid handling system 2 is illustrated. The fluid handling system 1 may be used for preparation of the acidic treatment fluid comprising the hydrogel and for introduction of the acidic treatment fluid into a wellbore. The fluid handling system 2 may include mobile vehicles, immobile installations, skids, hoses, tubes, fluid tanks or reservoirs, pumps, valves, and/or other suitable structures and equipment. For example, the fluid handling system 2 may include a fluid supply 4 and pumping equipment 6, both of which may be fluidically coupled with a wellbore supply conduit 8. The fluid supply 4 may contain the hydrogel and corresponding acidic treatment fluid. The pumping equipment 6 may be used to supply the acidic treatment fluid from the fluid supply 4, which may include tank, reservoir, connections to external fluid supplies, and/or other suitable structures and equipment. While not illustrated, the fluid supply 4 may contain one or more components (e.g., hydrogel, base fluid, acid) of the acidic treatment in separate tanks or other containers that may be mixed at any desired time. Pumping equipment 6 may be fluidically coupled with the wellbore supply conduit 8 to communicate the acidic treatment fluid into the wellbore. Fluid handling system 2 may also include surface and down-hole sensors (not shown) to measure pressure, rate, temperature and/or other parameters of acidizing treatment. Fluid handling system 2 may include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection treatment. Fluid handling system 2 can be configured as shown in FIG. 1 or in a different manner, and may include additional or different features as appropriate. Fluid handling system 2 may be deployed via skid equipment, marine vessel, or may be comprised of sub-sea deployed equipment.

Figure 2:
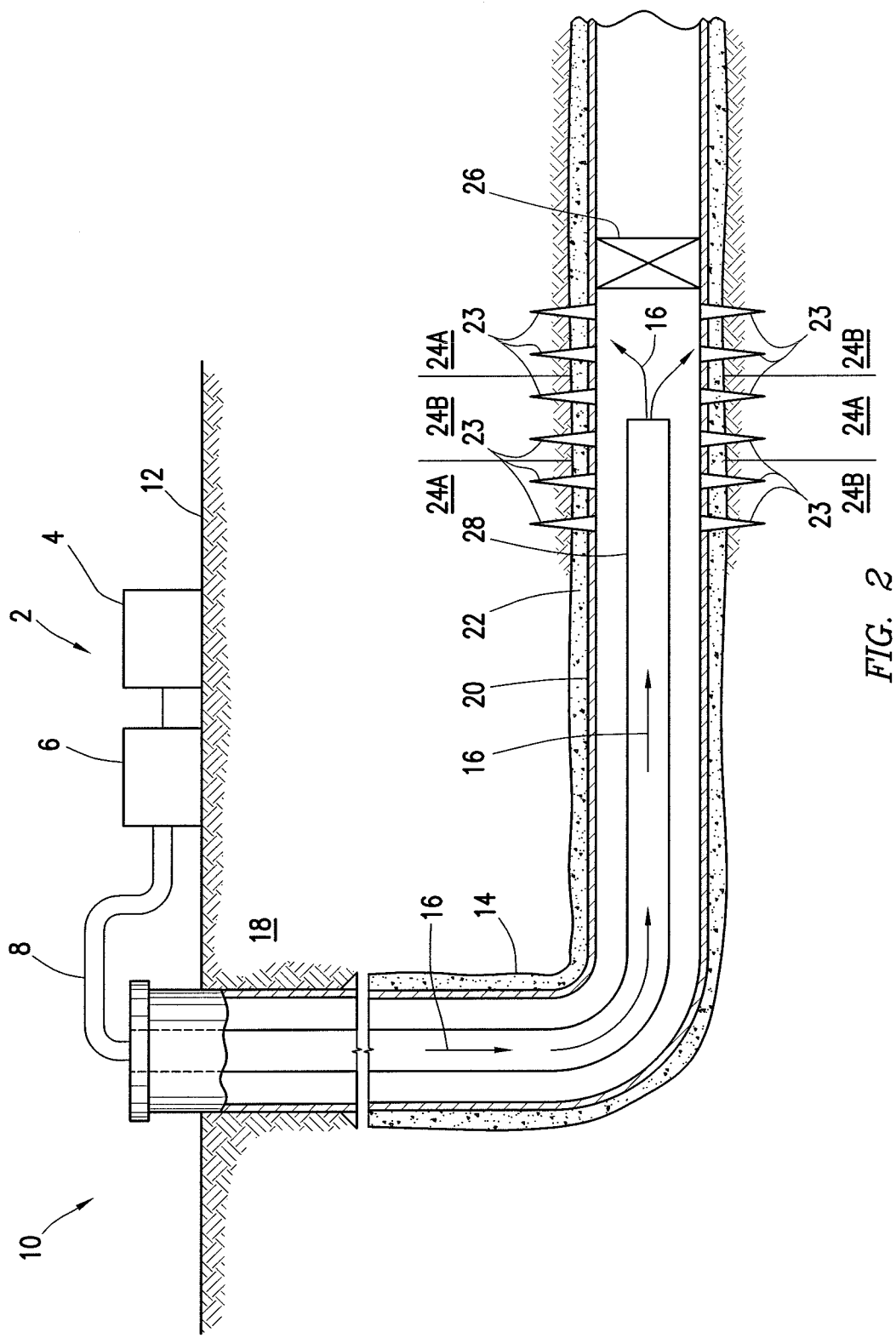
FIG. 2 is a schematic illustration of example well system showing placement of an acidic treatment fluid into a wellbore.

Turning now to FIG. 2, an example well system 10 is shown. As illustrated, the well system 10 may include a fluid handling system 2, which may include fluid supply 4, pumping equipment 6, and wellbore supply conduit 8. As previously described in connection with FIG. 1, pumping equipment 6 may be fluidically coupled with the wellbore supply conduit 8 to communicate the permeability modifier into wellbore 14. As depicted in FIG. 2, the fluid supply 4 and pumping equipment 6 may be above the surface 12 while the wellbore 14 is below the surface 12. Well system 10 may be configured as shown in FIG. 2 or in a different manner, and may include additional or different features as appropriate.

As illustrated on FIG. 2, the well system 10 may be used for introduction of an acidic treatment fluid, described herein, into subterranean formation 18 surrounding the wellbore 14. Generally, a wellbore 14 may include horizontal, vertical, slanted, curved, and other types of wellbore geometries and orientations, and the permeability modifier 16 may generally be applied to subterranean formation 18 surrounding any portion of wellbore 14. As illustrated, the wellbore 14 may include a casing 20 that may be cemented (or otherwise secured) to wellbore wall by cement sheath 22. Perforations 23 allow acidic treatment fluids (e.g., which may comprise the hydrogel) and/or other materials to flow into and out of the subterranean formation 18. A plug 26, which may be any type of plug (e.g., bridge plug, etc.) may be disposed in wellbore 14 below the perforations 23 if desired.

The acidic treatment fluid 16, may be pumped from fluid supply 4 down the interior of casing 20 in wellbore 14. As illustrated, well conduit 28 (e.g., coiled tubing, drill pipe, etc.) may be disposed in casing 20 through which the acidic treatment fluid 16 may be pumped. The well conduit 28 may be the same or different than the wellbore supply conduit 8. For example, the well conduit 28 may be an extension of the wellbore supply conduit 8 into the wellbore 14 or may be tubing or other conduit that is coupled to the wellbore supply conduit 8. The acidic treatment fluid 16 may be allowed to flow down the interior of well conduit 28, exit the well conduit 28, and finally enter subterranean formation 18 surrounding wellbore 14 by way of perforations 23 through the casing 20 (if the wellbore is cased as in FIG. 2) and cement sheath 24.

Acidic treatment fluid may preferentially enter the areas of subterranean formation 18 with the highest permeabilities, noted as first treatment zones 24A. The acidic treatment fluid may not initially flow into the portions of subterranean formation 18 with lower permeabilities, noted as second treatment zones 24B. For diversion of acidic treatment fluid to second treatment zones 24B, hydrogel may be introduced into first treatment zones 24A. The hydrogel may be introduced into the first treatment zones 24A, for example, in the acidizing treatment fluid or an aqueous spacer or other suitable delivery means. In the first treatment zones 24A, the hydrogel may absorb water and swell to produce a barrier to fluid flow. As the hydrogel may be pH activated, they may not initially absorb water at pH values of the acidic treatment fluid until it has spent due to reaction with acid-soluble materials in the first treatment zones 24A. The barrier formed by the hydrogel may divert subsequent acidizing treatments, such as additional acidizing treatment fluids, to areas of lesser permeability in the subterranean formation 18, such as second treatment zones 24B.

The exemplary hydrogel disclosed herein may directly or indirectly affect one or more components or pieces of equipment associated with the preparation, delivery, recapture, recycling, reuse, and/or disposal of the hydrogel and corresponding acidic treatment fluids. For example, the hydrogel may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the hydrogel. The hydrogel may also directly or indirectly affect any transport or delivery equipment used to convey the hydrogel to a well site or downhole such as, for example, any transport vessels, conduits, pipelines, trucks, tubulars, and/or pipes used to compositionally move the hydrogel from one location to another, any pumps, compressors, or motors (e.g., topside or downhole) used to drive the hydrogel into motion, any valves or related joints used to regulate the pressure or flow rate of the hydrogel (or fluids containing the same hydrogel, and any sensors (i.e., pressure and temperature), gauges, and/or combinations thereof, and the like. The disclosed hydrogel may also directly or indirectly affect the various downhole equipment and tools that may come into contact with the hydrogel such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method for acid diversion, comprising:
applying a first acidizing treatment to a first treatment zone of a subterranean formation;
introducing a hydrogel to the first treatment zone, wherein the hydrogel comprises a graft polymer, wherein the graft polymer comprises a biopolymer backbone and side chains grafted onto the biopolymer backbone, wherein the side chains comprise hydrophilic groups such that the graft polymer has the property of reduced absorption of water by at least 90% at pH 2 as compared to a neutral pH, and wherein the graft polymer is crosslinked; and
applying a second acidizing treatment to the subterranean formation, wherein the hydrogel diverts the second acidizing treatment to a second treatment zone.

2. The method of claim 1, wherein the first acidizing treatment and the second acidizing treatment utilize the same acidic treatment fluid.

3. The method of claim 1, wherein the hydrogel is introduced to the first treatment zone in the first acidizing treatment.

4. The method of claim 1, wherein applying the first acidizing treatment comprises introducing an acidic treatment fluid comprising an aqueous base fluid, an acid, and the hydrogel into the first treatment zone.

5. The method of claim 4, wherein the acidic treatment fluid has pH of less than 2 when introduced into the subterranean, wherein the acid reacts in the first treatment zone such that the pH of the acidic treatment fluid increases to a pH of greater than 2.

6. The method of claim 1, wherein introducing the hydrogel to the first treatment zone comprises introducing an aqueous spacer comprising the hydrogel between the first acidizing treatment and the second acidizing treatment.

7. The method of claim 1, further comprising allowing the hydrogel to degrade over time in the subterranean formation.

8. The method of claim 1, further comprising contacting the hydrogel in the subterranean formation with an oxidizer.

9. The method of claim 1, wherein the graft polymer comprises a poly(acryiamide-co-methacrylic acid) grafted gum ghatti-based biopolymer.

10. The method of claim 1, wherein the graft polymer comprises a copolymer of acrylamide and itaconic acid.

11. The method of claim 1, wherein the graft polymer comprises a chitosan backbone and side chains derived from acrylic acid and 2-hydroxy-ethyl methacrylate.

12. The method of claim 1, wherein the graft polymer comprises a composite of silica gel and galactomannan-g-poly(sodium acrylate).

13. A method for acid diversion, comprising:
introducing an acidic treatment fluid to a first treatment zone of a subterranean formation, wherein the acidic treatment fluid comprises an aqueous base fluid, an acid, and a hydrogel, wherein the hydrogel comprises a graft polymer comprising a biopolymer backbone and side chains grafted onto the biopolymer backbone, wherein the side chains comprise hydrophilic groups such that the graft polymer has the property of reduced absorption of water by at least 90% at pH 2 as compared to a neutral pH, and wherein the graft polymer is crosslinked;
reacting the acid with acid-soluble materials in the first treatment zone such that pH of the acidic treatment fluid increases from an initial pH of about 2 or less to a pH of from about 2 to about 4 such that the hydrogel is activated;
allowing the hydrogel to form a barrier to fluid flow in the first treatment zone; and
diverting a subsequently introduced acidic treatment fluid to a second treatment zone in the subterranean formation.

14. The method of claim 13, wherein the subsequently introduced acidic treatment fluid is the same as the acidic treatment fluid.

15. The method of claim 13, further comprising introducing an aqueous spacer fluid into the subterranean formation between the acidic treatment fluid and the subsequently introduced acidic treatment fluid.

16. The method of claim 13, wherein the graft polymer is selected from the group consisting of a poly(acrylamide-co-methacrylic acid) grafted gum ghatti-based biopolymer, a copolymer of acrylamide and itaconic acid, a chitosan-g-poly(acrylic-acid-co-2-hydroxyethyl-methacrylate), and a composite of silica gel and galactomannan-g-poly(sodium acrylate).

17. A well system comprising:
an acidic treatment fluid comprising an aqueous base fluid, an acid, and a hydrogel, wherein the hydrogel comprises a graft polymer comprising a biopolymer backbone and side chains grafted onto the biopolymer backbone, wherein the side chains comprise hydrophilic groups such that the graft polymer has the property of reduced absorption of water by at least 90% at pH 2 as compared to a neutral pH, and wherein the graft polymer is crosslinked;
a fluid handling system comprising the acidic treatment fluid; and
a conduit fluidically coupled to the fluid handling system and a wellbore.

18. The well system of claim 17, wherein the fluid handling system comprises a fluid supply and pumping equipment.

19. The well system of claim 17, wherein the graft polymer is selected from the group consisting of a poly(acrylamide-co-methacrylic acid) grafted gum ghatti-based biopolymer, a copolymer of acrylamide and itaconic acid, a chitosan-g-poly(acrylic-acid-co-2-hydroxyethyl-methacrylate), and a composite of silica gel and galactomannan-g-poly(sodium acrylate).

* * * * *